United States Patent [19]

Blose

[11] 4,324,049

[45] Apr. 13, 1982

[54] GAGING SYSTEM AND METHOD

[75] Inventor: Thomas L. Blose, Houston, Tex.

[73] Assignee: Hydril Company, Los Angeles, Calif.

[21] Appl. No.: 91,270

[22] Filed: Nov. 5, 1979

[51] Int. Cl.³ .............................................. G01B 7/28
[52] U.S. Cl. .................. 33/199 B; 33/174 L; 33/174 Q; 33/174 P
[58] Field of Search ............ 33/174 L, 174 P, 174 Q, 33/179.5, 199 R, 199 B, 178 E, 178 D, 169 R, 172 E, 147 N, 147 K, 23 C, 1 M, 164 C, 148 R, 148 E, 148 H

[56] References Cited

U.S. PATENT DOCUMENTS

| | | | |
|---|---|---|---|
| 1,614,448 | 1/1927 | Mensforth et al. | 33/199 R |
| 1,879,398 | 9/1932 | Mirfield | 33/199 R |
| 2,233,626 | 3/1941 | McClure | 33/199 R |
| 2,331,757 | 10/1943 | Anders | 33/199 R |
| 2,547,774 | 4/1951 | Prais | 33/199 R |
| 2,958,951 | 11/1960 | Altson | 33/178 R |
| 3,047,960 | 8/1962 | Mittenbergs et al. | 33/199 R |
| 3,090,126 | 5/1963 | Kernoski | 33/199 R |
| 3,091,867 | 6/1963 | Ryan | 33/199 R |
| 3,217,418 | 11/1965 | Wennerberg | 33/174 Q X |
| 3,432,935 | 3/1969 | Reish | 33/199 R |
| 3,478,436 | 11/1969 | Barnes | 33/170 |
| 3,501,943 | 3/1970 | Kelling et al. | 33/174 L X |
| 3,537,184 | 11/1970 | Hearn et al. | 33/199 R |
| 3,561,125 | 2/1971 | Zeidler | 33/174 J |
| 3,590,492 | 7/1971 | Johnson | 33/199 R |
| 3,750,295 | 8/1973 | Nordmann et al. | 33/174 L |
| 3,805,393 | 4/1974 | Lemelson | 33/174 L |
| 3,812,591 | 5/1974 | Michaud | 33/199 R |
| 3,872,602 | 3/1975 | Kennedy et al. | 33/199 R |
| 3,950,858 | 4/1976 | Donner et al. | 33/179.5 D |
| 3,989,284 | 11/1976 | Blose | 285/332.2 |
| 4,053,989 | 10/1977 | Yamaji | 33/174 PC |
| 4,166,323 | 9/1979 | Maag | 33/179.5 R |

FOREIGN PATENT DOCUMENTS

| | | | |
|---|---|---|---|
| 727867 | 2/1966 | Canada | 33/174 L |
| 390036 | 2/1924 | Fed. Rep. of Germany | 33/199 B |
| 483605 | 10/1929 | Fed. Rep. of Germany | 33/199 R |
| 1074862 | 2/1960 | Fed. Rep. of Germany | 33/172 E |
| 2200432 | 10/1972 | Fed. Rep. of Germany | 33/199 R |
| 241025 | 8/1969 | U.S.S.R. | 33/199 R |

*Primary Examiner*—Harry N. Haroian
*Attorney, Agent, or Firm*—William W. Haefliger

[57] ABSTRACT

A gaging system and method involves sensing longitudinal, lateral and rotatable displacements of a gaging tip or probe, for processing, as via a computer, and read-out. One or more base positions of the tip may be selectively established; and corrections for misalignment of the gage relative to the work may be made as via the computer. Means is provided to obtain diameter or radius measurements associated with an annular body surface, at various locations on that surface, and said measurements may be averaged, as via the computer. Also, the measurement signals may be transmitted only after predetermined pressure application to a gaging tip.

43 Claims, 13 Drawing Figures

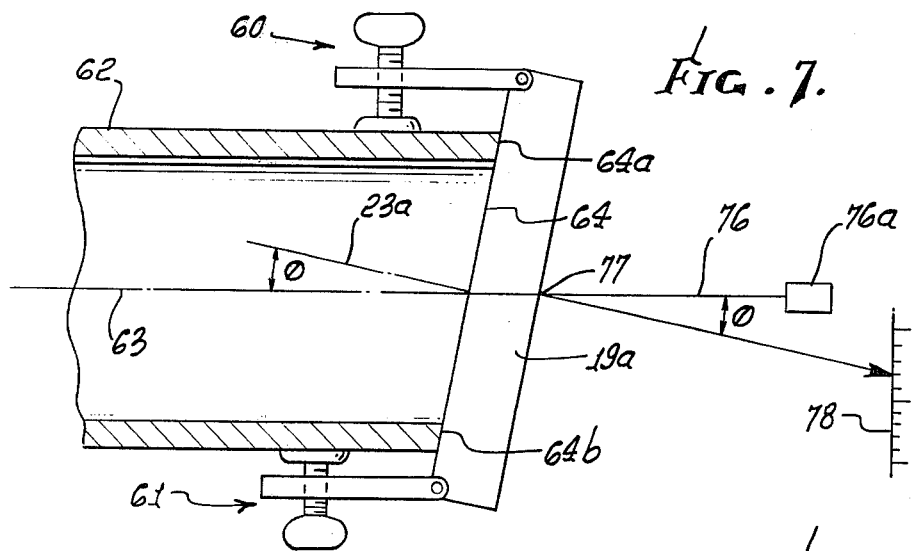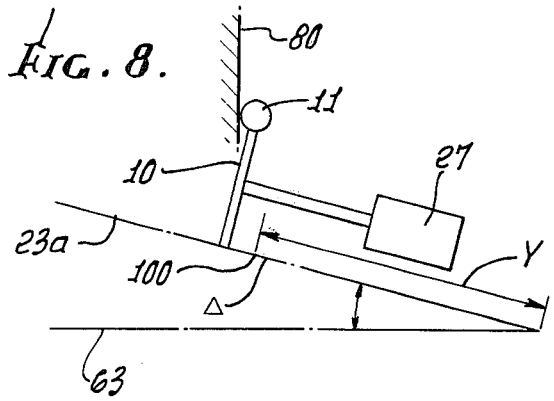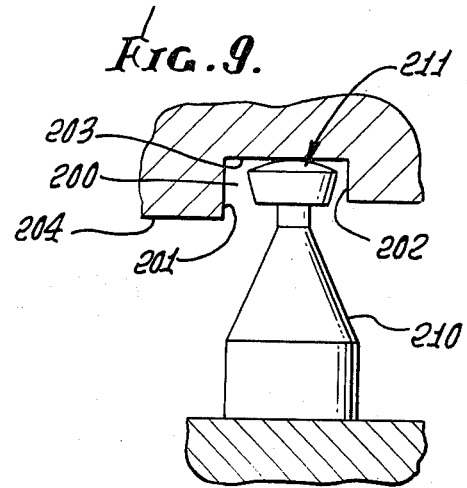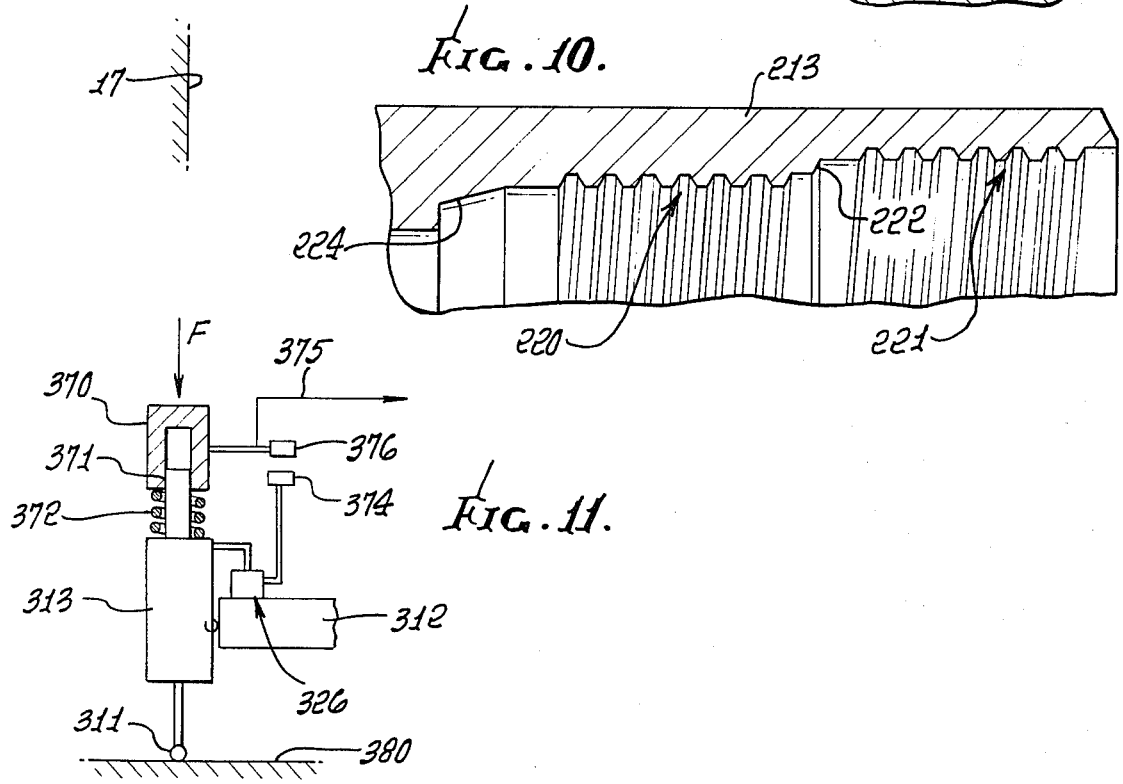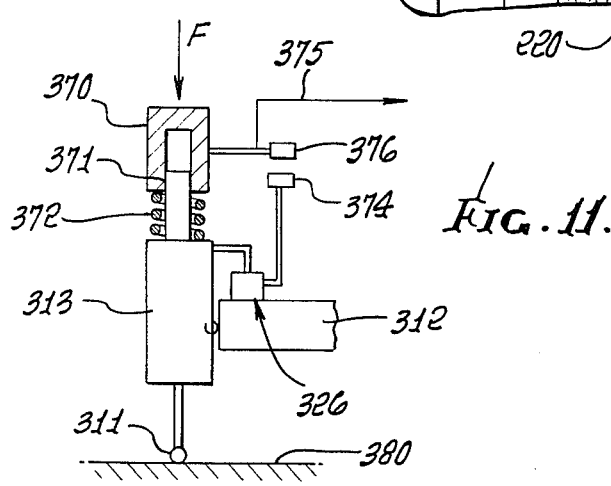

GAGING SYSTEM AND METHOD

BACKGROUND OF THE INVENTION

This invention relates generally to gaging systems, and more particularly concerns a system and method for accurately measuring and recording dimensions of work members, as for example tubular members including, but not limited, to lengths, diameters, radii and angular dimensions.

There is a continuing need for system and method to accurately measure the dimensions of work parts such as thread flank angularity, flank axial positioning along thread length, thread crest and root diameters, conical shoulders, and flange dimensions. The maintenance of dimensional accuracy is particularly important in respect of a new thread known as the Blose thread, and which is the subject of U.S. Pat. No. 3,989,284. While thread gages are known, none of which I am aware incorporate the unusually advantageous structural combinations, modes of operation and results now afforded by the present invention.

SUMMARY OF THE INVENTION

It is a major object of the invention to provide a gaging system and method meeting the above need and overcoming the disadvantages of prior gaging apparatus. Basically, and as will be seen, the invention is embodied in a system that comprises (a) first means having a gaging tip engageable with work surfaces, (b) means carrying said first means, for longitudinal, lateral and rotatable displacements of said tip, and (c) means to sense said longitudinal, lateral, and rotatable displacements of said tip for readout purposes.

As will be seen, a computer is connectible with the sensing means to establish at least one, and preferably multiple base positions from which one or multiple sensed displacements are measured.

More specifically, a single or multiple contact tip or probe is mechanically as well as electronically operable through a micro-processor, mini-computer, or other computing device which converts electrical signals to relative dimensional measurements. The system is such that a zero-position from which all longitudinal measurements are taken is related to a fixed base plate, or point on the gage itself, or the zero-position can be related to a non-fixed position which is established by a predetermined position of the probe or probes. This position is then identified by signaling the computer by electrical impulse so that all dimension measurements will be identified by this arbitrary position as the zero-position. For example, one can touch the probe to a shoulder, after the gage is clamped into or onto the end of a pipe, then signal the computer that from this arbitrarily chosen contact point at the shoulder one will detect and identify movements of the probe or probes.

The same basis for establishing probe movements will apply for axial, radial, or circumferential movements of the probe or probes. Also the probe may be contructed so that with pressure (by hand or automated) applied to the probes the contact point location will not be transmitted to the computer until pre-determined pressure is applied. Accordingly, contact pressure of the probe will not affect changes in the measurement recorded, which removes the human element from affecting measurement recordation.

It is contemplated that the system have capabilities of establishing the zero-position for taking measurements at will rather than a fixed base or position on the mechanism itself from which all measurements are taken. Further, the signals to be generated by the probe are enabled by the use of encoders, or potentiometers, or differential transformers, or electrical strain gages. The strain-gage principle would be preferred for applications where extremely small incremental measurements are required. Other devices which have a uniformly varying resistance with strain may be used. This allows small variations in voltage or current in a uniformly varying manner rather than "step" variations. Another system that may be applicable would be the use of an inductive system in which eddy current interference variations are employed. The intent is to establish a basis for a uniformly varying electrical signal so that very small changes in signal can be amplified and identified with respect to extremely small measurement variations. Encoders are suitably accurate for linear measurements within tenths of thousandths and are satisfactory for most dimensions linear or angular as applied to tubular products.

A further object is to provide means to measure the annular curvature of surfaces such as pipe bores or outer cylindrical surfaces, and to display diameters or radial measurements associated with such curved surfaces. Such diameters may be derived for curvatures at different points about a pipe axis, and averaged by computer, to display an average pipe diameter.

These and other objects and advantages of the invention, as well as the details of an illustrative embodiment, will be more fully understood from the following description and drawings in which:

DRAWING DESCRIPTION

FIG. 7 is a diagram showing one method of determination of angular error of gage clamp-up to a pipe;

FIG. 8 is a diagram showing the effect of angular error of gage clamp-up, during measurement;

FIG. 9 is an enlarged view showing reception of a gaging part between thread flanks;

FIG. 10 is a modified pipe thread section; and

FIG. 11 is a schematic showing of a means to transmit a signal after pressure is applied to gaging tip.

DETAILED DESCRIPTION

Figure 2:
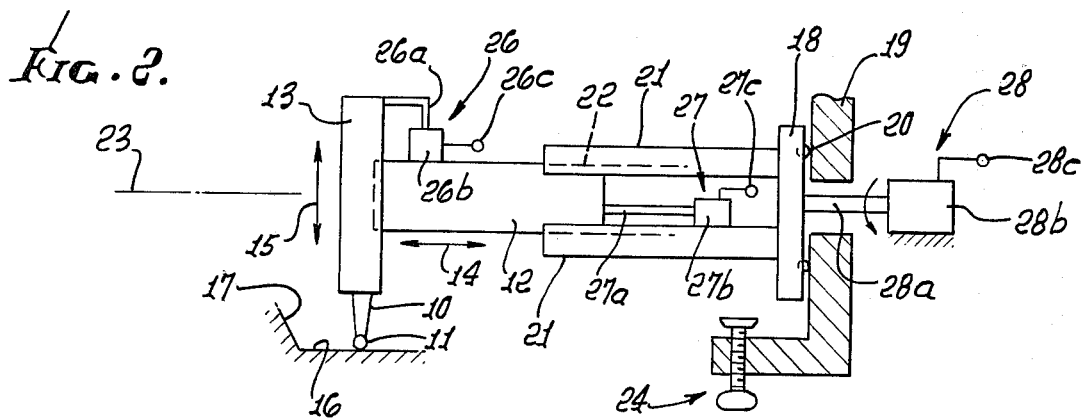
FIG. 2 is a schematic view of apparatus incorporating the invention.

Generally speaking, the gaging system of the invention contemplates the provision of first means having a gaging tip engageable with a work surface, means carrying the first means for longitudinal, lateral and rotatable displacements of the tip, and means to sense such tip displacements, for readout purposes. Merely as illustrative, a first means having a gaging tip is shown in FIG. 2 as including a stem 10 supporting a gaging tip 11 at the end of the stem. Such first means is supported by means such as a slide or linear bearing unit 12 for longitudinal displacement of the tip, and a slide or linear bearing 13 for lateral displacement of the tip. Slide 13 may be carried by slide 12, as shown, and slide 12 may move in an axial direction indicated by arrows 14 whereas slide 13 may move in a radial direction indicated by arrows 15. Such directions are typically related to the axial and radial dimensions of bodies such as pipes, tubes, screw threads, flanges and the like, whose dimensions are to be gaged or measured. The slides may be moved manually or by actuators. Merely as illustrative, tip 11 is shown engaging bore 16 and as movable into engagement with shoulder 17, which may be annular and conical, or may be a thread flank.

The described means carrying the first means also includes a rotor 18 enabling rotatable displacement of the tip 11. Thus, for example, rotor 18 is supported for rotation relative to fixed structure 19 as via ball bearings 20 therebetween; and the rotor carries longitudinal ways 21 for slide 12. Suitable linear bearings 22 may be provided between slide 12 and ways 21. Rotor 18 is rotatable (manually or by actuator) about an axis 23 parallel to the longitudinal direction 14, for example. Clamp means to clamp the fixed support structure 19 to a pipe or other body to be gaged is schematically shown at 24.

Also provided are means to sense the described longitudinal (for example axial), lateral (for example radial), and rotatable (for example about the longitudinal axis) displacements of the tip, for readout purposes. Such means are shown at 26, 27 and 28, respectively, in FIG. 2, and may take the form of various devices which preferably have electrical outputs proportional to displacements of the tip 11. Element 26a of device 26 moves in direction 15 with slide 13, while element 26b is attached to slide 12; element 27a of device 27 moves in direction 14 with slide 12, while element 27b is fixed to guideways 21; and rotary element 28a of device 28 rotates about axis 23 with rotor 18; while element 28b is fixed to support 19. See for example the potentiometer 30 in FIG. 5a having a resistance element 30a and a wiper arm element 30b, current being supplied to the resistance at 33. The voltage output at 34 depends on the position of the wiper arm element relative to the resistance. See also, for example, the encoder 35 in FIG. 5b with movable element 35a and fixed element 35b, with digitized output at 36. One such known digital length gage or encoder is identified as METRO 1010. Finally, note the variable differential transformer 37 shown in FIG. 5c, with movable core element 37a displacement (linearly or rotatably) in the fields of transformer coil elements. The latter include coil 37b connected to oscillator 38 providing carrier frequency. Voltage is thereby induced in two secondary coils 37c and 37d connected in series opposition, so that the two voltages in the secondary current are opposite in phase, the net output of the transformer being the difference of these voltages. Accordingly, movement of the core produces an output which is suitably conditioned at 40 and 41 to produce a linear output displayed at 42. One example of a rotary variable differential transformer is Model R30A, a product of Schaevitz Engineering, Pennsauken, N.J. Referring again to FIG. 2, the output terminals of the sensors are indicated at 26c, 27c and 28c.

Figure 1:
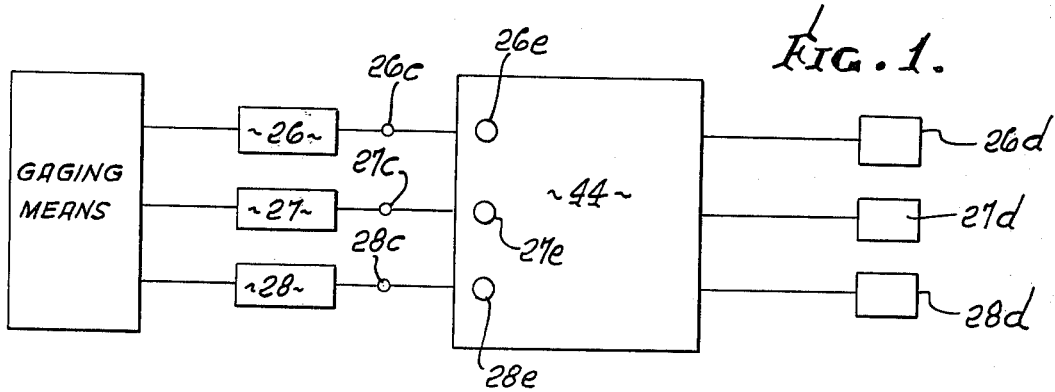
FIG. 1 is a block diagram.

FIG. 1 shows, in block diagram form, the provision of a computer 44 connected with the sensing means 26, 27 and 28 via terminals 26c, 27c and 28c, for establishing at least one (and preferably several) base positions from which the sensed displacement, or displacements, of the tip 11 are measured, and then displayed at displays 26d, 27d and 28d (corresponding to sensors 26, 27 and 28). Only one display may be provided, if desired, to selectively display the outputs of the sensors. The computer is characterized as enabling selective establishment of "zero" base positions from which the sensed displacements are measured. For this purpose, three push-buttons 26e, 27e and 28d may be located in association with the computer, to enable operator selected "zeroing" of the various readouts at 26d, 27d and 28d.

Figure 5A:
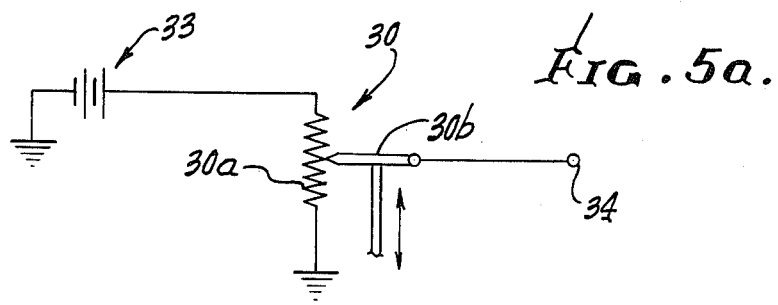
FIGS. 5a–5c are circuit diagrams.
Figure 5B:
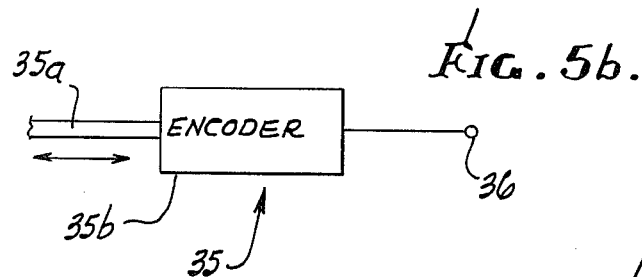
Figure 5C:
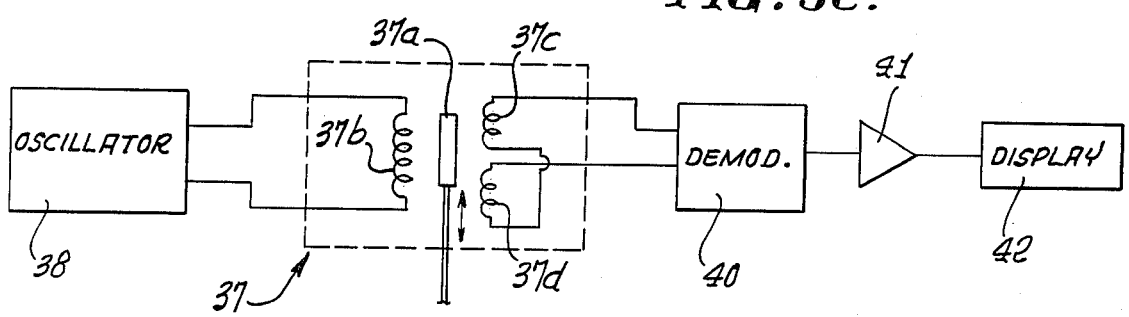
Figure 6:
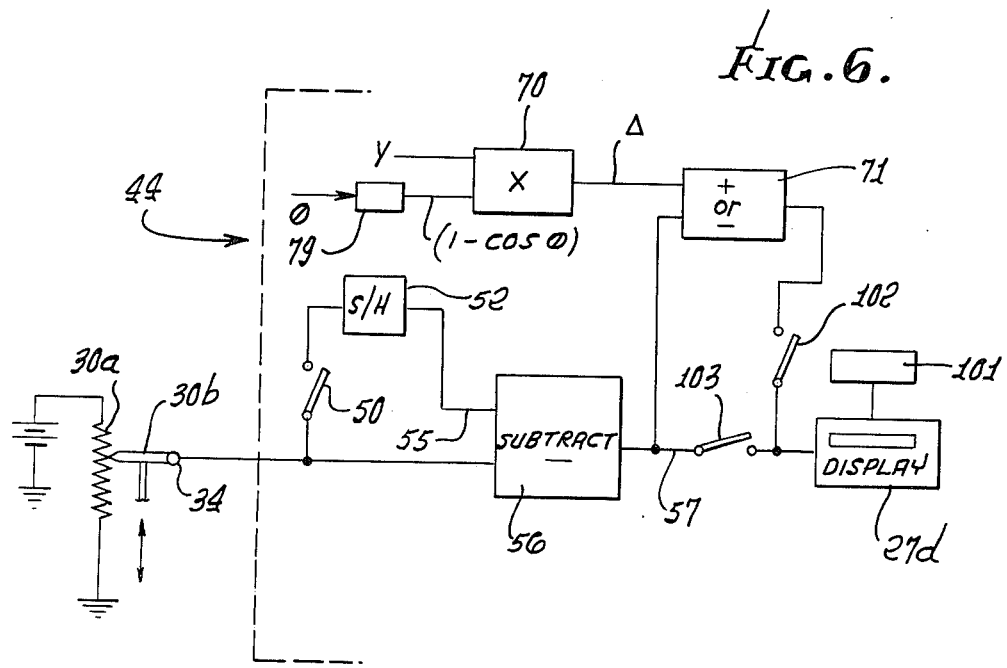
FIG. 6 is a block diagram.

One example of such a computer is shown in FIG. 6, connected with terminal 34 of an output sensor of the type shown in FIG. 5a. That sensor might correspond to sensor 27 in FIG. 2, measuring displacement in the axial or longitudinal direction 14. The zeroing push button 27e in FIG. 1 then corresponds to switch 50 in FIG. 6 adapted to be momentarily closed when the push-button is selectively pushed at the chosen zero or base position of that tip 11 in the direction 14. This connects a sample and hold circuit 52 with the output of the sensor at terminal 34. The latter output, and also the output (at 55) of the sample and hold circuit are fed to subtraction circuit 56, the output of which is fed at 57 to display 27d. Accordingly, the display reads "zero" at the chosen position of the tip, and subsequent movements of the tip in the longitudinal direction 14 are measured and displayed linearly from that base position. The same may be accomplished for displays 26 and 28, via push buttons 26e and 28e. Other types of circuitry may be substituted for that shown in FIG. 6 (as for example voltage-to-frequency conversion and up/down counters, etc.).

The invention also contemplates the provision of circuitry, such as computer circuitry, to compensate for variations in the base position which result from tip displacements which in turn vary as a result of misalignment errors in locating the gage relative to the work. Reference is made in this regard to FIGS. 7 and 8, FIG. 7 showing a support 19a (corresponding to support 19 in FIG. 2) clamped at 60 and 61 to a pipe 62, with the support 19a axially misaligned by an annular amount $\phi$ relative to the pipe axis 63. Such misalignment may occur as a result of lack of true "squareness" of the pipe end 64 engaged by the support 19a, as is shown in exaggerated form in FIG. 7. (Note the axially offset relationship of pipe end portions 64a and 64b.) If the FIG. 2 support 19 datum surface 19b were similarly clamped to pipe end 64, the gage tip 11 would travel along axis 23a in FIG. 7 (corresponding to axis 23 in FIG. 2) instead of in the direction of pipe axis 63, and a chosen base point for the gage tip 11 would then vary along axis 63 (i.e. lengthwise of the pipe) as a result of displacement of the tip along axis 23a.

The computer 44 compensates for such variations in base point location by conditioning or modifying the value fed to the display 27d in FIG. 6.

The corrected or modified value of base point along the axis 63 is, for example, derived from multiplier 70 in FIG. 6 to which inputs $(1-\cos\phi)$ and y are fed. Each value $\Delta$ is shown as subtracted (or added) at 71 from the zero base output 57 of subtractor 56 referred to above. Thus, in FIG. 8, if the slide 12 has moved a distance y along angled axis 23a, and a zero base position is established at 100, it must be corrected by an amount $\Delta$ to correspond to distance moved along true axis 63, $\Delta$ being equal to y $(1-\cos\phi)$. The output of device 71 is then fed to display 27d. The display may again be "zeroed" by means 101. Multiplier 71 received the values "y" and $(1-\cos\phi)$ to be multiplied to produce $\Delta$. Note switches 102 and 103 operable to switch in the correction means 71, when desired.

The value $\phi$ may be suitably derived, as for example optically in FIG. 7, with beam 76 from a source 76a reflected at surface 77 on base 19a toward a scale 78. The value cos $\phi$ may be derived in a function generator 79 in FIG. 6. The value "y" is generated at the output of the sensor 27. (Note in FIG. 8 that as the tip is rotated about misaligned axis 23a while in contact with surface 80 normal to true axis 63, the output of sensor 27 changes, showing variations in base position as a function of rotation of the tip). In similar manner, the base points may be corrected for rotation of the tip 11 about axis 23a.

Figure 4:
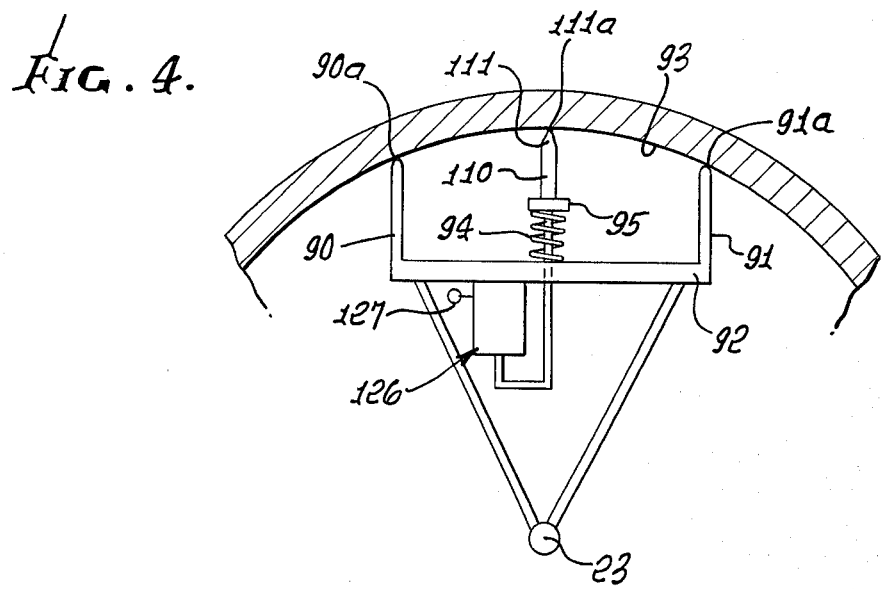
FIG. 4 is a view showing apparatus for curvature or diameter determination.

The invention also contemplates the provision of means to engage a curved surface for establishing a dimension associated with a circle, as for example a diameter D, or radius R. Referring to FIG. 4, such means typically defines two reference probes 90 and 91 projecting in generally the same direction, as from a support 92 to which those probes are fixed. The ends of the probes are shown as engaging curved surface 93 at 90a and 91a. The movable gaging tip 111 in this instance is carried by the support for movement relative to the curved surface. A spring 94 urges the gaging tip 111 into engagement with the surface at 111a. Merely for purpose of illustration, the spring is located between the support and a flange 95 on the movable tip stem 110. A sensor 126 (corresponding to sensor 26) senses the position of the movable tip and produces output at 127. Since the position of the ends of fixed probes 90 and 91 are predetermined, the position of tip 111 relative to those probes is a measurement of curvature of the surface 93, and correspondingly is a measurement of diameter D of such a curved surface which may be displayed at 26d in FIG. 1. Typically, the surface engaging ends of the probes and tip are in substantially the same plane, normal to axis 23 in FIG. 2. Support 92, probes 90 and 91, and gaging tip 111 may be carried by slide 13 in FIG. 2. A portion of that slide is also indicated in FIG. 4.

Figure 3:
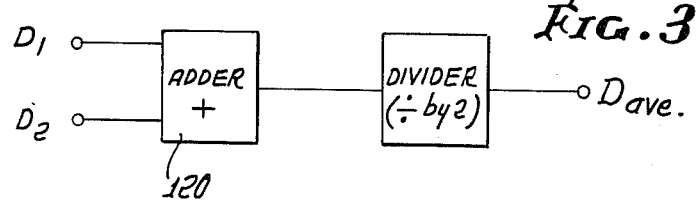
FIG. 3 is a block diagram.

In use, the FIG. 4 apparatus may be rotated about the axis, and curvature measurements taken to establish diameter measurements $D_1$ and $D_2$ associated with a pipe curved bore, for example at 90° intervals about axis 23. $D_1$ and $D_2$ may then be averaged by the computer 44 and displayed. See FIG. 3 in this regard, showing $D_1$ and $D_2$ adding circuit 120, and divide-by-2 circuit 121, to derive $D_{ave}$.

FIG. 9 shows a gaging tip 211 (corresponding to tip 11 in FIG. 2) carried for axial, and radial movement in the space 200 between successive screw thread flights, to be engageable with axially opposite thread flanks 201 and 202, and with thread root 203 and thread crest 204. Tip 211 is carried by a stem 210 (corresponding to stem 10 in FIG. 2). The screw thread may be formed in a pipe or tube, for example. The tip 211 is also rotatable about the axis of such a pipe. FIG. 10 shows a pipe box end 213 having a two-step thread indicated at 220 and 221. Pin locating shoulders are shown at 222 and 224. Such shoulders and the threads may be accurately gaged by the system of the present invention.

Finally, referring to FIG. 11, it shows, schematically, the provision of one form of means to transmit a sensing signal from a sensor 326 to a computer (as in FIG. 1), only after predetermined force F or pressure has been applied to the gaging tip 311, as via the slide or carrier 313. For this purpose, pusher 370 is slidably attached at 371 to the slide, and a spring 372 is interposed between the slide and pusher. The slide position signal developed by sensor 326 appears at output contact 374; however, that signal is only transmitted at 375 after the pusher has been forced toward the slide against resistance of the spring to bring a contact 376 into engagement with contact 374. Such predetermined force is, of course, transmitted via the spring to the slide to urge tip 311 against surface 380 to be gaged. Slides 312 and 313 correspond to slides 12 and 13, in FIG. 2.

I claim:

1. In a work gaging system, said work being in the form of a pipe defining work surfaces as a thread extending about an axis, the combination comprising
   (a) first means having a gaging tip engageable with said work surfaces,
   (b) means supporting said first means, for longitudinal, lateral and rotatable displacements of said tip, and
   (c) means to sense said longitudinal, lateral, and rotatable displacements of said tip for readout purposes,
   (d) said gaging tip sized to be freely received between successive threads to be bodily displaced axially from a position of engagement with a thread flank facing in one axial direction and into another position of engagement with a thread flank facing on the opposite axial direction,
   (e) said (b) means including a first slide movable in a first direction generally parallel to said axis, and a second slide movable in a second direction extending generally radially relative to said first direction, one of said slides carried by the other and movable relative thereto, and a rotor carrying said other slide for bodily rotating it about an axis generally parallel to said first direction, whereby both slides are rotated by the rotor,
   (f) and a support for said rotor.

2. The combination of claim 1 wherein said longitudinal and lateral displacements are in axial and radial directions, respectively.

3. The combination of claim 2 wherein said rotatable displacement is about said axial direction.

4. The combination of claim 1 including a computer connected with said (c) means to sense said displacements for establishing at least one base position from which at least one of said sensed displacements is measured.

5. The combination of claim 1 including a computer connected with said (c) means to sense said displacements for establishing multiple base positions from which multiple of said sensed displacements are measured.

6. In a gaging system, the combination comprising
   (a) first means having a gaging tip engageable with work surfaces,
   (b) means supporting said first means, for longitudinal, lateral and rotatable displacements of said tip,
   (c) means to sense said longitudinal, lateral, and rotatable displacements of said tip for readout purposes,
   (d) a computer connected with said (c) means to sense said displacements for establishing at least one base position from which at least one of said sensed displacements is measured,
   (e) and including locating means to locate the gaging tip relative to said work surfaces and characterized in that said base position may vary as a function of displacement of the tip, the computer connected to compensate for said variance.

7. The combination of claim 6 wherein said variance arises as a result of said rotatable displacement, and the displacement being measured is either longitudinal or lateral.

8. The combination of claim 1 wherein at least one of said sensing means is resistive to produce a linear output.

9. The combination of claim 1 wherein at least one of said sensing means includes an inductance, to produce a linear output.

10. The combination of claim 1 wherein at least one of said sensing means comprises an encoder.

11. The combination of claim 1 wherein at least one of said sensing means comprises a differential transformer, to establish a linear output.

12. In a gaging system, the combination comprising
(a) first means having a gaging tip engageable with work surfaces,
(b) means supporting said first means, for longitudinal lateral and rotatable displacements of said tip,
(c) means to sense said longitudinal, lateral, and rotatable displacements of said tip for readout purposes,
(d) said gaging tip being carried by said support means for movement in a selected direction, and including means defining two reference probes that are fixed relative to said support means and cooperating with said movable gaging tip to engage a work surface having curvature to establish a dimension associated with a circle,
(e) said (b) means including a first slide movable in a first direction, and a second slide movable in a second direction extending generally radially relative to said first direction, one of said slides carried by the other and movable relative thereto, and a rotor carrying said other slide for bodily rotating it about an axis generally parallel to said first direction, whereby both slides are rotated by the rotor.

13. The combination of claim 12 wherein said reference probes and said gaging tip are substantially in the same plane.

14. The combination of claim 12 including said work in the form of a pipe defining said surface curvature, said gaging tip and said reference probes engaging said pipe curved surface.

15. The combination of claim 14 including said work, and wherein said curved surface is defined by a work thread.

16. The combination of claim 12 including yieldable means operatively connected with said gaging tip to urge said tip into contact with said curved surface.

17. The combination of claim 12 wherein said support means has a first position wherein said gaging tip and said reference probes are engageable with the curved surface, and also has a subsequent and second relatively rotated position wherein the gaging tip and reference probes are again engageable with the curved surface, thereby to establish first and second dimensions associated with first and second circles.

18. The combination of claim 17 wherein said two dimensions are first and second diameters.

19. The combination of claim 12 wherein said support means has multiple relatively rotated positions in each of which said gaging tip and reference probes are engageable with the curved surface, thereby to establish multiple dimensions associated with multiple circles.

20. The combination of claim 19 wherein said multiple dimensions are diameters.

21. The combination of claim 18 including a computer connected to said sensing means associated with said movable tip and operable to average said diameters.

22. The combination of claim 6 including said work in the form of a pipe defining said surfaces.

23. The combination of claim 22 wherein said surfaces are defined by a thread.

24. The combination of claim 12 including said work having a thread defining said surfaces.

25. The combination of claim 1 wherein said work has a conical work surface engageable by said tip.

26. The combination of claim 12 including said work defining a conical surface having annular curvature, said gaging tip and said reference probes engaging said conical surface at a gaging location, axially.

27. The combination of claim 26 wherein said gaging tip and said reference probes have multiple relatively rotated positions of engagement with said conical surface, at said gaging location, axially.

28. The combination of claim 26 wherein said first and second dimensions are first and second diameters.

29. The combination of claim 28 including a computer connected to said sensing means associated with said movable tip and operable to average said diameters.

30. In a gaging system, the combination comprising
(a) first means having a gaging tip engageable with work surfaces,
(b) means supporting said first means, for longitudinal, lateral and rotatable displacements of said tip,
(c) means to sense said longitudinal, lateral, and rotatable displacements of said tip for readout purposes,
(d) and means to transmit a sensing signal from said (c) means only after predetermined force has been applied to the gaging tip via said (b) means,
(e) said (b) means including a first slide movable in a first direction, and a second slide movable in a second direction extending generally radially relative to said first direction, one of said slides carried by the other and movable relative thereto, and a rotor carrying said other slide for bodily rotating it about an axis generally parallel to said first direction, whereby both slides are rotated by the rotor.

31. The method of operating a gaging system that includes
(a) first means having a gaging tip engageable with work surfaces,
(b) means supporting said first means, for longitudinal, lateral and rotatable displacements of said tip, said supporting means including a first slide movable in a first direction, and a second slide movable in a second direction extending generally radially relative to said first direction, one of said slides carried by the other and movable relative thereto, and a rotor carrying said other slide for bodily rotating it about an axis generally parallel to said first direction, whereby both slides are rotated by the rotor, and
(c) means to sense said longitudinal, lateral, and rotatable displacements of said tip for readout purposes, said method incuding:
(d) locating said (b) means in predetermined relation to a workpiece,
(e) operating said (b) means to displace said first means and said tip longitudinally, laterally and rotatably, thereby to bring the tip into engagement with successive surfaces of the workpiece,
(f) sensing the extents of said longitudinal, lateral and rotary displacements, and
(g) transmitting a signal or signals from said (c) means only after predetermined force has been applied to the gaging tip via said (b) means.

32. The method of claim 31 including operating a computer connected with said (c) means to sense said signal or signals for establishing at least one base position from which at least one of said sensed displacements is measured.

33. The method of claim 31 wherein said tip is displaced to determine surface curvature of the workpiece.

34. The combination of claim 30 wherein said longitudinal and lateral displacements are in axial and radial directions, respectively.

35. The combination of claim 34 wherein said rotatable displacement is about said axial direction.

36. The combination of claim 30 including a computer connected with said (c) means to sense said displacements for establishing at least one base position from which at least one of said sensed displacements is measured.

37. In a gaging system, the combination comprising
 (a) first means having a gaging tip engageable with work surfaces,
 (b) means supporting said first means, for longitudinal, lateral and rotatable displacements of said tip,
 (c) means to sense said longitudinal, lateral, and rotatable displacements of said tip for readout purposes,
 (d) and means to transmit a sensing signal from said (c) means only after predetermined force has been applied to the gaging tip via said (b) means,
 (e) a computer connected with said (c) means to sense said displacements for establishing at least one base position from which at least one of said sensed displacements is measured,
 (f) and including locating means to locate the gaging tip relative to said work surfaces and characterized in that said base position may vary as a function of displacement of the tip, the computer connected to compensate for said variance.

38. The combination of claim 30 wherein at least one of said sensing means comprises an encoder.

39. The combination of claim 30 wherein said gaging tip is carried by said support means for movement in a selected direction, and including means defining two reference probes that are fixed relative to said support means and cooperating with said movable gaging tip to engage a surface having curvature to establish a dimension associated with a circle.

40. The combination of claim 39 including said work in the form of a pipe defining said surface curvature, said gaging tip and said reference probes engaging said pipe curved surface.

41. The combination of claim 40 including said work, and wherein said curved surface is defined by a work thread.

42. The combination of claim 30 including said work in the form of a pipe defining said surfaces.

43. The combination of claim 42 wherein said surfaces are defined by a thread.

* * * * *